United States Patent
Gowda et al.

(10) Patent No.: US 11,678,018 B2
(45) Date of Patent: Jun. 13, 2023

(54) METHOD AND SYSTEM FOR LOG BASED ISSUE PREDICTION USING SVM+RNN ARTIFICIAL INTELLIGENCE MODEL ON CUSTOMER-PREMISES EQUIPMENT

(71) Applicant: ARRIS Enterprises LLC, Suwanee, GA (US)

(72) Inventors: Sunil Kumar Puttaswamy Gowda, Karnataka (IN); Muhammed Mufeed Konaje, Kerala (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/468,957

(22) Filed: Sep. 8, 2021

(65) Prior Publication Data
US 2022/0086529 A1 Mar. 17, 2022

Related U.S. Application Data

(60) Provisional application No. 63/078,721, filed on Sep. 15, 2020.

(51) Int. Cl.
*H04N 21/466* (2011.01)
*H04N 21/25* (2011.01)
*G06N 3/045* (2023.01)

(52) U.S. Cl.
CPC ......... *H04N 21/4667* (2013.01); *G06N 3/045* (2023.01); *H04N 21/251* (2013.01); *H04N 21/4665* (2013.01)

(58) Field of Classification Search
CPC ........... H04N 21/4667; H04N 21/4666; H04N 21/4665; H04N 21/4425; H04N 21/251;
(Continued)

(56) References Cited

U.S. PATENT DOCUMENTS

2010/0054136 A1 3/2010 Mehta et al.
2017/0109584 A1* 4/2017 Yao ..................... H04N 21/4666
(Continued)

FOREIGN PATENT DOCUMENTS

CN 110995384 A 4/2020
KR 10-2019-0107523 A 9/2019

OTHER PUBLICATIONS

Notification of Transmittal of the International Search Report (Forms PCT/ISA/220 and PCT/ISA/210) and the Written Opinion of the International Searching Authority (Form PCT/ISA/237) dated Dec. 23, 2021, by the International Application Division Korean Intellectual Property Office in corresponding International Application No. PCT/US2021/049337. (9 pages).
(Continued)

*Primary Examiner* — Michael B. Pierorazio
(74) *Attorney, Agent, or Firm* — Panitch Schwarze Belisario & Nadel LLC

(57) ABSTRACT

A method, a set-top box, and a non-transitory computer readable medium for log based issue prediction. The method includes receiving, on a processing server, system log files from a customer-premises equipment, the system log files containing events that are logged by an operating system of the customer-premises equipment; parsing, by the processing server, the events of the system log files to processes and mapping the processes to one or more components of the customer-premises equipment; extracting, by the processing server, features from the mapped processes of the one or more components of the customer-premises equipment; classifying, by the processing server, the extracted features with a first machine learning algorithm; and predicting, by the processing server, anomalies in one or more components of the customer-premises equipment with a second machine
(Continued)

learning algorithm using the classified features from the first machine learning algorithm.

22 Claims, 15 Drawing Sheets

(58) Field of Classification Search
CPC .... H04N 21/2404; G06N 3/08; G06N 3/0454; G06N 3/0445
See application file for complete search history.

(56) References Cited

U.S. PATENT DOCUMENTS

| | | |
|---|---|---|
| 2018/0150704 A1* | 5/2018 | Lee ........................ G06V 10/50 |
| 2019/0089577 A1 | 3/2019 | Misra et al. |
| 2019/0179691 A1 | 6/2019 | Xu et al. |
| 2020/0196024 A1* | 6/2020 | Hwang ..................... G06T 1/20 |
| 2021/0406106 A1* | 12/2021 | Moss .................. G06F 16/2379 |

OTHER PUBLICATIONS

He et al., "Experience Report: System Log Analysis for Anomaly Detection", 2016 IEEE 27th International Symposium on Software Reliability Engineering (ISSRE), (Oct. 23-27, 2016), pp. 207-218.
Zhu et al., "Tools and Benchmarks for Automated Log Parsing", 2019 IEEE/ACM 41st International Conference on Software Engineering: Software Engineering in Practice (ICSE-SEIP), (Jan. 3, 2019), pp. 1-10.

* cited by examiner

| Name | Date modified | Type | Size |
|---|---|---|---|
| KATV-25977_KATV-25977_eventlog.15435... | 2/12/2019 12:40 AM | Text Document | 8 KB |
| KATV-25977_KATV-25977_epiLog.1546128... | 2/12/2019 12:40 AM | Text Document | 500 KB |
| KATV-25977_KATV-25977_epiLog.1546128... | 2/12/2019 12:40 AM | Text Document | 444 KB |
| KATV-25977_10.1.9.222.txt | 12/15/2018 1:51 AM | Text Document | 159,985 KB |
| KATV-25928_KATV-25928_Lowell_VHO6_V... | 2/12/2019 1:03 AM | Text Document | 8,436 KB |
| KATV-25928_KATV-25928_KATV-25928_KA... | 2/12/2019 1:02 AM | Text Document | 11,717 KB |
| KATV-25928_KATV-25928_KATV-25928_KA... | 2/12/2019 1:01 AM | Text Document | 189 KB |
| KATV-25928_KATV-25928_KATV-25928_KA... | 2/12/2019 1:01 AM | Text Document | 2,216 KB |
| KATV-25928_KATV-25928_hsnlogs.log | 2/12/2019 1:00 AM | Text Document | 1,314 KB |
| KATV-25904_KATV-25904_ftr_latest.txt | 2/12/2019 1:07 AM | Text Document | 1,469 KB |
| KATV-25904_KATV-25904_fixed_ipc.txt | 2/12/2019 1:06 AM | Text Document | 189 KB |
| KATV-25904_KATV-25904_fixed.txt | 2/12/2019 1:06 AM | Text Document | 413 KB |
| KATV-25782_VMS4100blinkmancrashonu... | 2/12/2019 9:24 AM | Text Document | 289,163 KB |
| KATV-25782_vms4100_purchased2.txt | 11/22/2018 3:57 AM | Text Document | 569 KB |
| KATV-25782_KATV-25782_Lowell_issue_n... | 2/12/2019 9:21 AM | Text Document | 5,319 KB |
| KATV-25782_KATV-25782_Lowell_issue_n... | 2/12/2019 9:20 AM | Text Document | 5,016 KB |
| KATV-25782_KATV-25782_KATV-25782_wi... | 2/12/2019 9:20 AM | Text Document | 4,132 KB |
| KATV-25782_KATV-25782_KATV-25782_KA... | 2/12/2019 9:19 AM | Text Document | 11,558 KB |
| KATV-25782_KATV-25782_KATV-25739_KA... | 2/12/2019 9:11 AM | Text Document | 9,217 KB |
| KATV-25782_KATV-25782_KATV-25739_wi... | 2/12/2019 9:18 AM | Text Document | 53,456 KB |
| KATV-25782_KATV-25782_epiLog.2.D4_AB... | 2/12/2019 9:10 AM | Text Document | 199 KB |
| KATV-25782_KATV-25782_epiLog.1.D4_AB... | 2/12/2019 9:10 AM | Text Document | 597 KB |

Folders:
- KA
  - KA_AP
  - KA_Application
  - KA_ASL
  - KA_AudVid
  - KA_Browser
  - KA_CA
  - KA_CBL
  - KA_CC
  - KA_Diags
  - KA_DLNA
  - KA_Download
  - KA_DVR
  - KA_DVT
  - KA_HAL
  - KA_Hardware
  - KA_HLS
  - KA_MotoPLYR
  - KA_Net
  - KA_Plat

FIG. 4A

| Search KA_Browser |

```
657772 08:17:18.692 streamer (674) Debug: [T5 Leaf] Estimated average bitrate: 12.40 Mbit/s
657773 08:17:20.031 dhclient(668) None: action=RENEW6; interface=br0; ip
2600:2:401:fd04::3;subnet=64;domain=;dns=2600:2:401:100::2;dhcp_t1=
15; dhcp_t2=45;userclass-tz_ieee-tz_file-;sroutes-;infocast- ;lease-
60; new_dhcp6_client_id=0:1:0:1:c7:92:bc:87:58:56:e8:e4:48:f8; new_dhcp6_server_id=
0:3:0:1:d0:39:b3:8a:c4:82; new_iaid-e8:e4:48:f8;new_life_starts-
1411647440; new_preferred_life=30;new_starts=
1411647440; gateway_manufacturer_oui-;gateway_product_class-; gateway_serial_number=; acs_url=https://motacs2.mot-
mobility.com:7547/edge/tr69;provisioning_code=twc;retry_interval_multiplier-2000;retry_minimum_wait_interval-
5;ntpsrv=;ntpsrv_fqdn_addr=napsrv_fqdn_addr=cpe-time-01.eng.rr.com
657774 08:17:28.715 superman(670) Debug: {event} TUNE: IR signal
Received: Key Code: 104
657775 08:17:29.582 opera-portal (709) Note: BackendFactory: deleting audio/video backend
657776 08:17:29.582 opera-portal (709) Note: Player:~TPlayer Closing c exit: id=1854, id=1854
657777 08:17:29.582 mediamanager (673) Debug: {event} TUNE: Player clos Issued
657778 08:17:29.622 mediamanager (673) Note: Active streamers:
657779 08:17:29.622 mediamanager (673) Note: 674 1854,
http://192.168.0.35:35003/Channel/_CH_31/A%26E+HD/593 CLOSING <play>
657780 08:17:29.623 streamer (674) Note: CLOSE command issued to source element
657781 08:17:29.623 streamer (674) Note: Source element state
successfully changed to STATE_IDLE
657782 08:17:29.625 streamer (674) Debug: [TS Leaf] Throwing away 21312
bytes of data when flushing
657783 08:17:29.625 streamer (674) NOTE: Positionoffsetstates.cpp:
Entering awaiting flow state
657784 08:17:29.629 streamer (674) Note: TSeekRangeUpdater.cpp:144 Stop stop seek range updater
657785 08:17:29.646 mediamanager (673) Note:
TstreamerSession::OnStateChanged 1854 - state = STATE_IDLE: type = 0,
```

FIG. 4B (CONTINUED)

| | | |
|---|---|---|
| KATV-17612_KATV-17612_IPC1100P2_192... | 10/18/2019 6:56 PM | Text Document 2 |
| KATV-24750_KATV-24750_CDLLOGScomp... | 10/18/2019 7:09 PM | Text Document 2 |
| KATV-23701_KATV-23701_VMS1100_192.1... | 10/18/2019 6:52 PM | Text Document 2 |
| KATV-23798_KATV-23798_VMS1100_192.1... | 10/18/2019 6:53 PM | Text Document 2 |
| KATV-24825_IPC4100_192.168.32.123_AVH... | 10/18/2019 7:26 PM | Text Document 2 |
| KATV-25782_KATV-25782_KATV-25782_KA... | 10/18/2019 6:58 PM | Text Document 1 |
| KATV-24287_KATV-24287_20180504_VMS4... | 10/18/2019 7:46 PM | Text Document 1 |
| KATV-25562_ipc4100_1_KATV-25562.txt | 10/18/2019 7:48 PM | Text Document 1 |
| KATV-25279_VMS1100_192.168.1.107.txt | 10/18/2019 6:53 PM | Text Document 1 |
| KATV-24809_KATV-24809_TTsenablenetfli... | 10/18/2019 7:51 PM | Text Document 1 |
| KATV-25251_KATV-25251_Beena_VMSNav... | 10/18/2019 6:58 PM | Text Document 1 |
| KATV-24976 KATV-24976_hsnvms4100.log | 10/18/2019 6:56 PM | Text Document 1 |
| KATV-17612_KATV-17612_Blink.PowerKey... | 10/18/2019 7:16 PM | Text Document 1 |
| KATV-24504_KATV-24504_VMS1100_192.1... | 10/18/2019 7:26 PM | Text Document 1 |
| KATV-24955_KATV-24955_AP_KA25011002... | 10/18/2019 6:54 PM | Text Document 1 |
| KATV-26017_KATV-26017_BFV_KATV26017... | 10/18/2019 7:16 PM | Text Document 1 |
| KATV-24721_debugLog.727.BC_64_4B_8F_... | 10/18/2019 7:47 PM | Text Document 1 |
| KATV-24808_VMS1100_192.168.1.120.txt | 10/18/2019 6:57 PM | Text Document 1 |
| KATV-23775_10.1.8.226.txt | | |
| KATV-23845_LOG_1_VMS_BeforeFIX_Rem... | 10/18/2019 7:44 PM | Text Document 1 |

- ParsedData
  - KA_AP
  - KA_Browser
  - KA_CA
  - KA_CC
  - KA_Diags
  - KA_DLNA
  - KA_Download
  - KA_DVR
  - KA_MotoPLYR
  - KA_Net
  - KA_Plat
  - KA_Prochalserver
  - KA_Prostreamer
  - KA_ProcSuperMan
  - KA_ProjNetflix
  - KA_SrvAcq
- Raw Data

FIG. 4C blinkman <1564> Note: PrintMemoryInformation: Memory State: OK + Discardable: 14512 kB (18 %) + V8: 29372 kB (36 %) + Partition: 6391 (8%) + oilpan: 7728 kB (10%) + Generic: 22808 kB (28 %)
blinkman <1564> Note: PrintMemoryInformation: Graphics size: 97263 kB of 285772 kB (34 %)
blinkman <1564> Note: PrintMemoryInformation: Window Memory: ID = 64,
Allocated: 23818 KB = Discardable: 14312 kB + V8: 4964 kB + Partition: 574 kB + Generic: 3752 kB
blinkman <1564> Note: PrintMemory Information: Window Memory: ID = 192
Allocated: 41876 kB = Discardable: 200 kB + V8: 21136 kB + Partition: 5344 kB + Generic: 7872 kB
blinkman <1564> Note: PrintMemoryInformation: Window Memory: ID - 448
Allocated: 6300 kB = Discardable: 0 kB + V8: 3272 kB + Partition: 472 kB + Generic: 2368 kB
blinkman <1564> Note: PrintMemoryInformation: Browser allocated memory 86592 kB of 409600 kB (21 %) + Discardable: 14512 kB (17 %) + V8: 30468 kB (35%) + Partition: 6967 (8 %) + oilpan: 11392 kB (13 %) + Generic: 23252 kB (27 %)
blinkman <1564> Note: PrintMemoryInformation: Memory State: OK +
blinkman <1564> Note: PrintMemoryInformation: Window Memory: ID = 64,
Allocated: 23822 kB = Discardable: 14312 kB + V8: 4964 kB + Partition: 574 kB + Generic: 3756 kB
blinkman <1564> Note: PrintMemoryInformation: Window Memory: ID - 192
Allocated: 47724 kB = Discardable: 200 kB + V8: 22232 kB + Partition: 5920 kB + Generic: 8384 kB
blinkman <1564> Note: PrintMemoryInformation: Window Memory: ID - 448
Allocated: 6312 kB - Discardable: 0 kB + V8: 3272 kB + Partition: 472 kB + Generic: 2380 kB
blinkman <1564> Note: PrintMemoryInformation: Browser allocated memory 92292 kB of 409600 kB (23 %) +
blinkman <1564> Note: PrintMemoryInformation: Memory State: OK + Discardable: 14512 kB (16 %) + V8: 31952 kB (35%) + Partition: 7511 (8 %) + oilpan: 14532 kB (16 %) + Generic: 23784 kB (26 %)
blinkman <1564> Note: PrintMemoryInformation: Window Memory: ID - 64

FIG. 4C (CONTINUED)

| EventTemplate | Label |
|---|---|
| - APassignDtcpSslID - EXCEPTION thrown:com.netopia.nbbs.tr<*>.connreq.Connection | KA_AP |
| - APassignDtcpSslID - EXCEPTION thrown:com.netopia.nbbs.tr<*>.TR<*>TimeoutExcep | KA_AP |
| - APassignDtcpSslID - EXCEPTION thrown:InformRequest:[ | KA_AP |
| - A PassignDtcpSslID - UNABLE TO CONNECT TO<*> | Normal |
| - ApplicationId=<*> | Normal |
| 'called but it's not available | Normal |
| - Current State is <*> | Normal |
| Device Services.STBService.<*>.X_<*>_diagnostics.General.bootInformWindow Devi | Normal |
| - DL block<*>is segment<*> of <*> | Normal |
| - Downloader message was not enqueued. Error Code:<*>, | KA_Download |
| --- downloadErr<*>:DL<*> | Normal |
| --- downloadError:DL<*> | KA_Download |
| - Error initializing module (<*>x<*>) | KA_ProjNetflix |
| - Error opening file '/flash/drm/netflix/NetflixSageDrm.bin'. (No such file or directory) | KA_ProjNetflix |
| - exporting key with handle <*> | Normal |
| - Intersegment Timer cancelled cancel ID:<*> | Normal |
| --- Invalid state or url here --- | Normal |
| --- ObjectName:<*> | Normal |

FIG. 5

METHOD AND SYSTEM FOR LOG BASED ISSUE PREDICTION USING SVM+RNN ARTIFICIAL INTELLIGENCE MODEL ON CUSTOMER-PREMISES EQUIPMENT

TECHNICAL FIELD

The present disclosure generally relates to a method and system for log based issue prediction using support vector machine plus recurrent neural network (SVM+RNN) artificial intelligence (AI) on customer-premises equipment or customer-provided equipment (CPE).

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard.

To provide television and data services, a MSO typically uses a Cable Modem Termination System ("CMTS") for the data services and a quadrature amplitude modulation ("QAM") multiplexer for downstream broadcast television, narrow cast and video-on-demand (VoD) traffic signals. These devices may be located at one or more hubs, which are typically connected to a head end via a network according to a networking protocol, such as Ethernet or SONET. A residential cable customer is typically connected to the CMTS and hub via a cable modem and a wireless router that may be combined in a single box which is called a gateway. In order to view video content that is transmitted through the cable modem or gateway, residential customers connect, for example, their televisions to a set-top box (STB).

The set-top box can be used by the subscriber to access a variety of multimedia services, including but not limited to live or linear television, digital video recorder (DVR) content, video-on-demand (VoD) content, over-the-top (OTT) content, and others. For example, set-top boxes usually play user selected content, for example, either live or with a digital video recorder (DVR).

Set-top boxes, however, can also be prone to anomalies including, for example, memory leaks, problems associated with central processing unit (CPU) usage and/or memory usage, and resources shortages which may lead to, for example, requiring the resetting of the set-top box and/or Wi-Fi link failures leading to audio/video (A/V) artifacts.

Accordingly, it would be desirable to be able to have an artificial intelligence and machine learning based model to predict software failures, for example, for customer-premises equipment or customer-provided equipment (CPE) including set-top boxes based on analysis of system logs or log files. In addition, by utilizing an artificial intelligence and machine learning based model, automatic fixes for the predicted software failures can be enabled and delivered to the customer-premises equipment or set-top box, which can help reduce triage time for the in house defects and field reported issues, the A/V artifacts leading to poor user experiences can be addressed relatively quickly, truck rolls or service calls can be reduced for situations like a "Freezing" or "Hanging" state of the set-top box in the field, and the costs associated with improving quality can be reduced.

Thus, there is a need for a technical solution that utilizes artificial intelligence and machine learning to predict anomalies in components of customer-premises equipment (CPE).

SUMMARY

In accordance with exemplary embodiments, a method and system for log based issue prediction using support vector machine plus recurrent neural network (SVM+RNN) artificial intelligence (AI) on customer-premises equipment or customer-provided equipment (CPE) including set-top boxes are disclosed.

In accordance with an aspect, a method is disclosed for log based issue prediction, the method comprising: receiving, on a processing server, system log files from a customer-premises equipment, the system log files containing events that are logged by an operating system of the customer-premises equipment; parsing, by the processing server, the events of the system log files to processes and mapping the processes to one or more components of the customer-premises equipment; extracting, by the processing server, features from the mapped processes of the one or more components of the customer-premises equipment; classifying, by the processing server, the extracted features with a first machine learning algorithm; and predicting, by the processing server, anomalies in one or more components of the customer-premises equipment with a second machine learning algorithm using the classified features from the first machine learning algorithm.

In accordance with another aspect, a set-top box is disclosed comprising: a processor configured to: receive system log files containing events that are logged by an operating system of the set-top box; parse the events of the system log files to processes and mapping the processes to one or more components of the set-top box; extract features from the mapped processes of the one or more components of the set-top box; classify the extracted features with a first machine learning algorithm; and predict anomalies in one or more components of the set-top box with a second machine learning algorithm using the classified features from the first machine learning algorithm.

In accordance with an aspect, a non-transitory computer readable medium having instructions operable to cause one or more processors to perform operations comprising: receiving, on a processing server, system log files from a customer-premises equipment, the system log files containing events that are logged by an operating system of the customer-premises equipment; parsing, by the processing server, the events of the system log files to processes and mapping the processes to one or more components of the customer-premises equipment; extracting, by the processing server, features from the mapped processes of the one or more components of the customer-premises equipment; classifying, by the processing server, the extracted features with a first machine learning algorithm; and predicting, by the processing server, anomalies in one or more components of the customer-premises equipment with a second machine learning algorithm using the classified features from the first machine learning algorithm.

BRIEF DESCRIPTION OF THE DRAWINGS

FIGS. 4A-4D are illustrations of exemplary folders for filtering the raw logs into a folder structure.

FIG. 5 is an illustration of an exemplary event template for log parsing.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
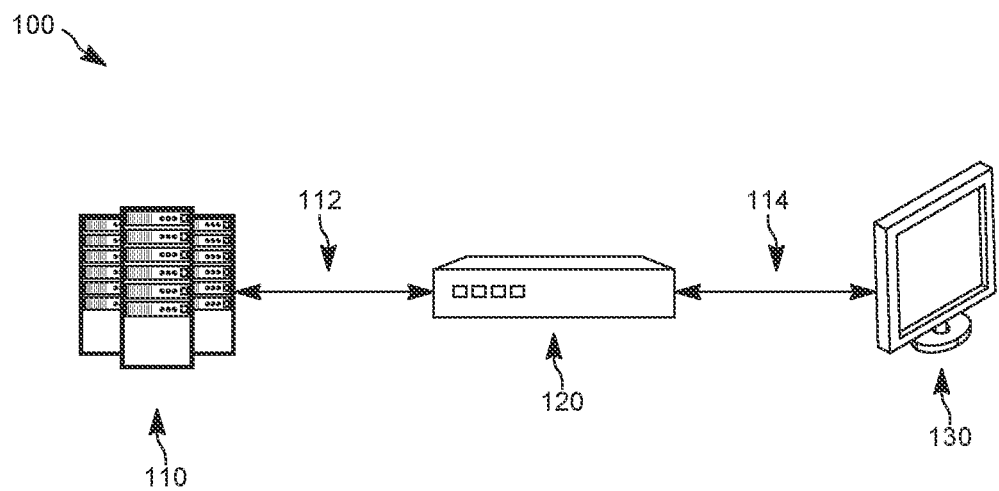
FIG. 1 is an illustration of an exemplary network environment for a method and system for log based issue prediction using a support vector machine plus recurrent neural network artificial intelligence SVM+RNN AI model on a customer-premises equipment (CPE).

System for Log Based Issue Prediction Using SVM+RNN Artificial Intelligence on CPE FIG. 1 is a block diagram illustrating an example network environment 100 for log based issue prediction using SVM+ RNN AI model on a customer premises equipment or customer-provided equipment (CPE), for example, a set-top box 120. In embodiments, a cable provider (or MSO) server 110 can provide, for example, media content, for example, video and/or data services to the set-top box 120. The set-top box 120 may communicate with one or more media play devices 130 over a local network 114 (for example, a local area network (LAN), a wireless local area network (WLAN), a personal area network (PAN), etc.) and/or wired, for example, a television. The set-top box 120 may communicate with an upstream wide area network (WAN) 112 to the cable provider server 110. In accordance with an embodiment, the cable provider server 110 can provide high-bandwidth data transfer, for example, media content, cable television and broadband internet access.

In accordance with an exemplary embodiment, the media device 130 may be any type of computing device configured to connect via a wireless network, for example, wireless network utilizing an IEEE 802.11 specification, including a smart phone, a smart TV, a computer, a mobile device, a tablet, or any other device operable to communicate wirelessly with the set-top box 120. In accordance with an alternative embodiment, the media device 130 can be a television, for example, that is directly connected to the set-top box 120.

In accordance with an exemplary embodiment, the set-top box 120 may communicate with the cable provider server 110 over a wired or a wireless connection. A wireless connection between the cable provider server 110 and the set-top box 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

As set forth, the set-top box 120, for example, the customer-premises equipment (CPE) device, typically provides access to a variety of multimedia services, including but not limited to live or linear television, digital video recorder (DVR) content, video-on-demand (VoD) content, over-the-top (OTT) content, and others. Alternatively, the set-top box 120 (e.g., customer-premises equipment) can receive Internet Protocol-based (IP-based) streaming content from through the upstream wide area network (WAN) 112 and cable provider server 110. In embodiments, various data, multimedia, and/or voice services may be delivered to the set-top box 120 including but not limited to, live or broadcast television, video-on-demand (VoD) content, pay-per view content, recorded content (e.g., DVR content), audio-only content, streaming content, and others. The set-top box 120 may process and output content to one or more media play device 130 such as a television, mobile device, tablet, computer, and any other device operable to receive video, voice, and/or data services.

Figure 2:
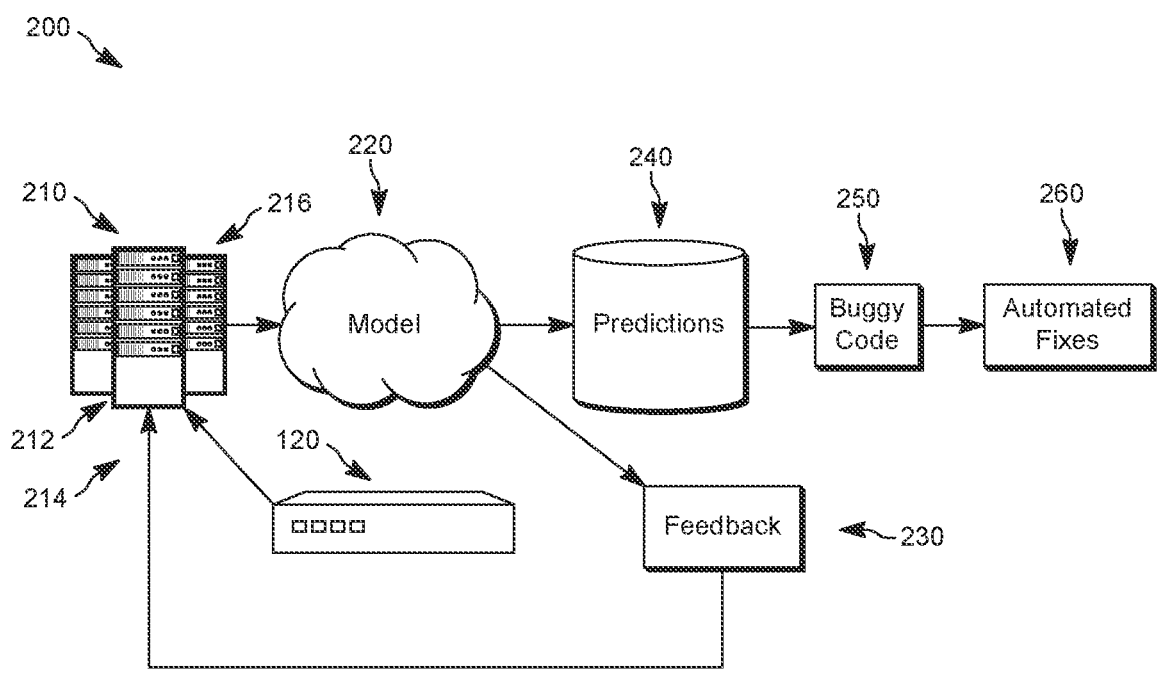
FIG. 2 is an illustration of an exemplary system for log based issue prediction using SVM+RNN artificial intelligence (AI) on a customer-premises equipment (CPE) in accordance with an embodiment.

FIG. 2 is an illustration of an exemplary system 200 for log based issue prediction using SVM+RNN artificial intelligence (AI) on customer-premises equipment (CPE) in accordance with an embodiment. As shown in FIG. 2, the exemplary system 200 includes the customer-premises equipment (CPE), for example, a set-top box 120 and a processing server 210 configured to receive and store computer files in form of log files from events that occur in the operating system or other software runs or messages between the cable provider server 110 and the set-top box 120. In accordance with an exemplary embodiment, the processing server 210 can include one or more servers 212, 214, 216 configured to capture, analyze, and/or store the log files received from the set-top box 120.

In accordance with an exemplary embodiment, logs collected from the set-top box 120 are input into the processing server 210, which logs are then parsed, and subjected to a feature extraction, for example, for training and use in a SVM+RNN AI model 220 as disclosed herein. The SVM+RNN AI model 220 can provide feedback 230, for example, during training of the SVM+RNN AI model and predictions 240, which can be used to identify code, for example, with bugs ("Buggy Code") and push automated fixes 260, for example, software code or patches to the set-top box 120.

For example, a support-vector machine (SVM) can trained with samples from two classes, and wherein the samples on the margin are called the support vector. In machine learning, support-vector machines (SVMs, also support-vector networks) are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall. In addition, a support-vector machine with kernel for converting low dimensions to high dimensions with the help of a kernel can be used.

In accordance with an exemplary embodiment, once the SVM+RNN AI model 220 has been trained as disclosed herein, the SVM+RNN AI model 220 can be part of the customer-premises equipment (e.g., set-top box 120).

Figure 3:
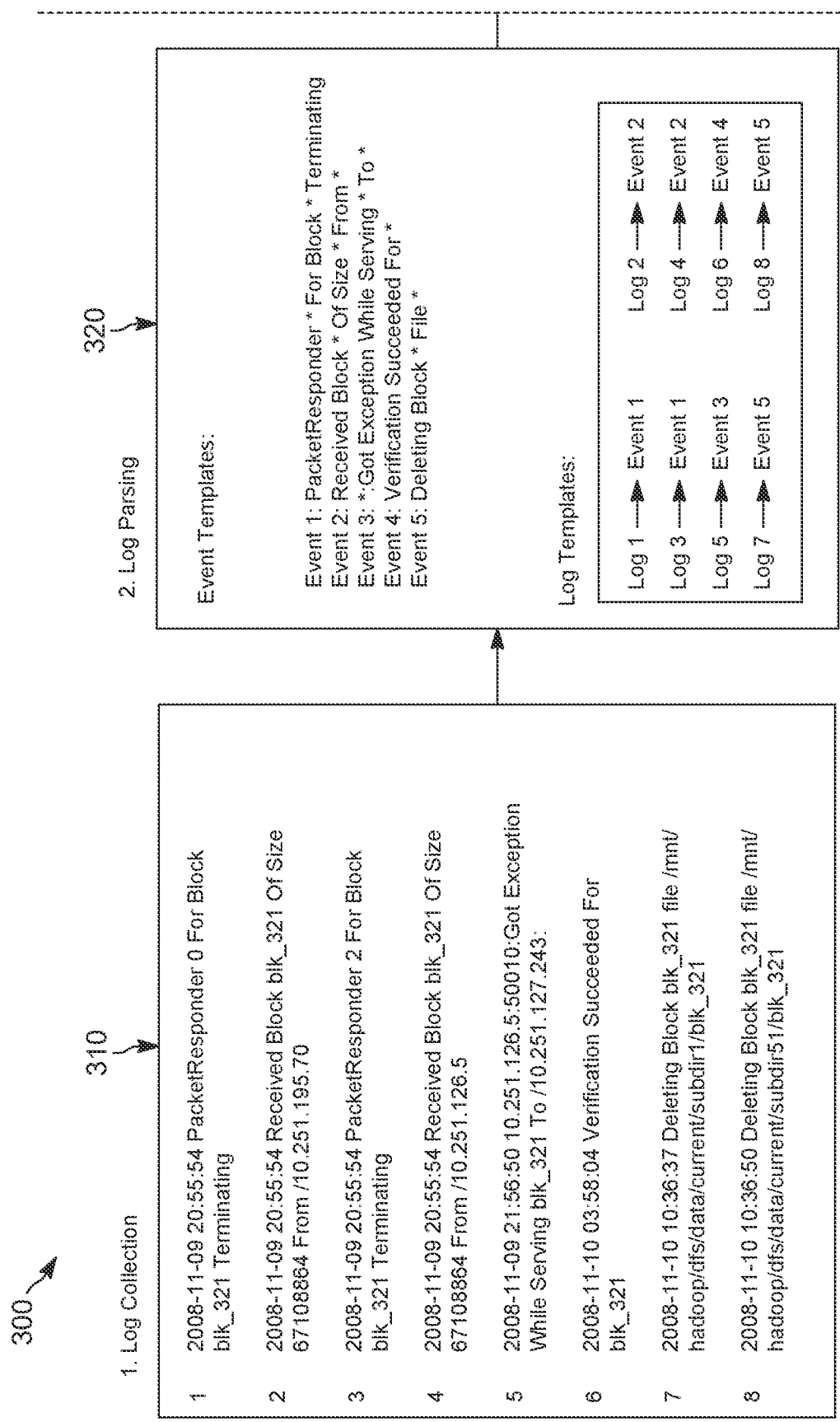
FIG. 3 is an illustration of an exemplary framework for a method and system for log based issue prediction using SVM+RNN AI model on a customer-premises equipment (CPE).
Figure 3:
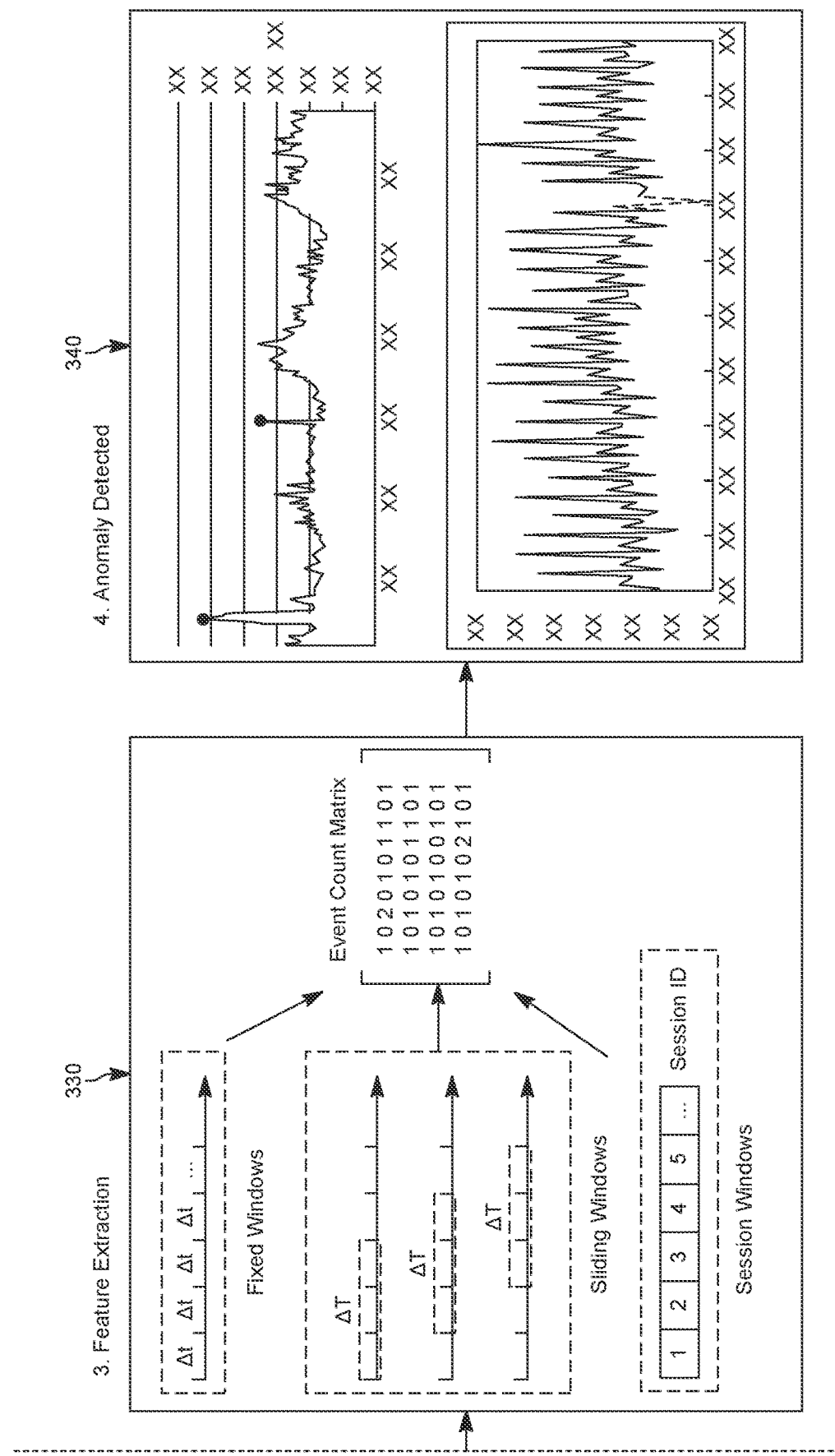

FIG. 3 is an illustration of an exemplary framework 300 for a method and system for log based issue prediction using SVM+RNN AI model on a customer-premises equipment (CPE). As shown in FIG. 3, the exemplary framework includes log collection 310, log parsing 320, feature extraction 330, and anomaly detection 340. In accordance with an exemplary embodiment, the processing server 210 collects logs (e.g., log files) from the messages obtained directly from the set-top box 120. The collected logs 310 can include, for example, a date and time and corresponding message. For example, the collected logs 310 can be system log files containing events that are logged by the operating system components. Once the logs are collected, the logs are parsed 320 using, for example, an event template. The event templates, can include, for example, Event 1: PacketResponder*for block*terminating; Event 2: Received bloc*of size*from*; Event 3: *: Got exception while serving*to*; Event 4: Verification succeeded for*; and Event 5: Deleting block*file*. In the parsing of the collected logs, each of the logs collected can be classified into one of the events, for example, Log 1→Event 1, Log 2→Event 2, Log 3→Event 1 . . . Event 8→Event 5. One the logs are classified, a feature extraction using fixed windows, sliding windows, and a session window is performed to generate an event count matrix. The event count matrix is then processed for anomaly detection 340 as disclosed herein.

In accordance with an exemplary embodiment, the log collection 310 can be performed, for example, from logs collected using a software tool, such as Jira developed by Atlassian, which is used for bug tracking, issue tracking, and project management. The logs can be collected using a query, for example, "project=KATV AND issuetype=Defect AND (status=Closed OR status=fixed) AND createdDate>=2018-01-01 AND attachments is not EMPTY". In accordance with an exemplary embodiment, only closed or fixed issues are input or taken for log collection. In addition, each of the collected logs can be grouped, for example, in a folder structure containing the name of the component as applied for the issue in Jira. For example, for a set-top box 120, logs for 30 different components could be identified as shown in FIG. 4A.

Figure 4B:
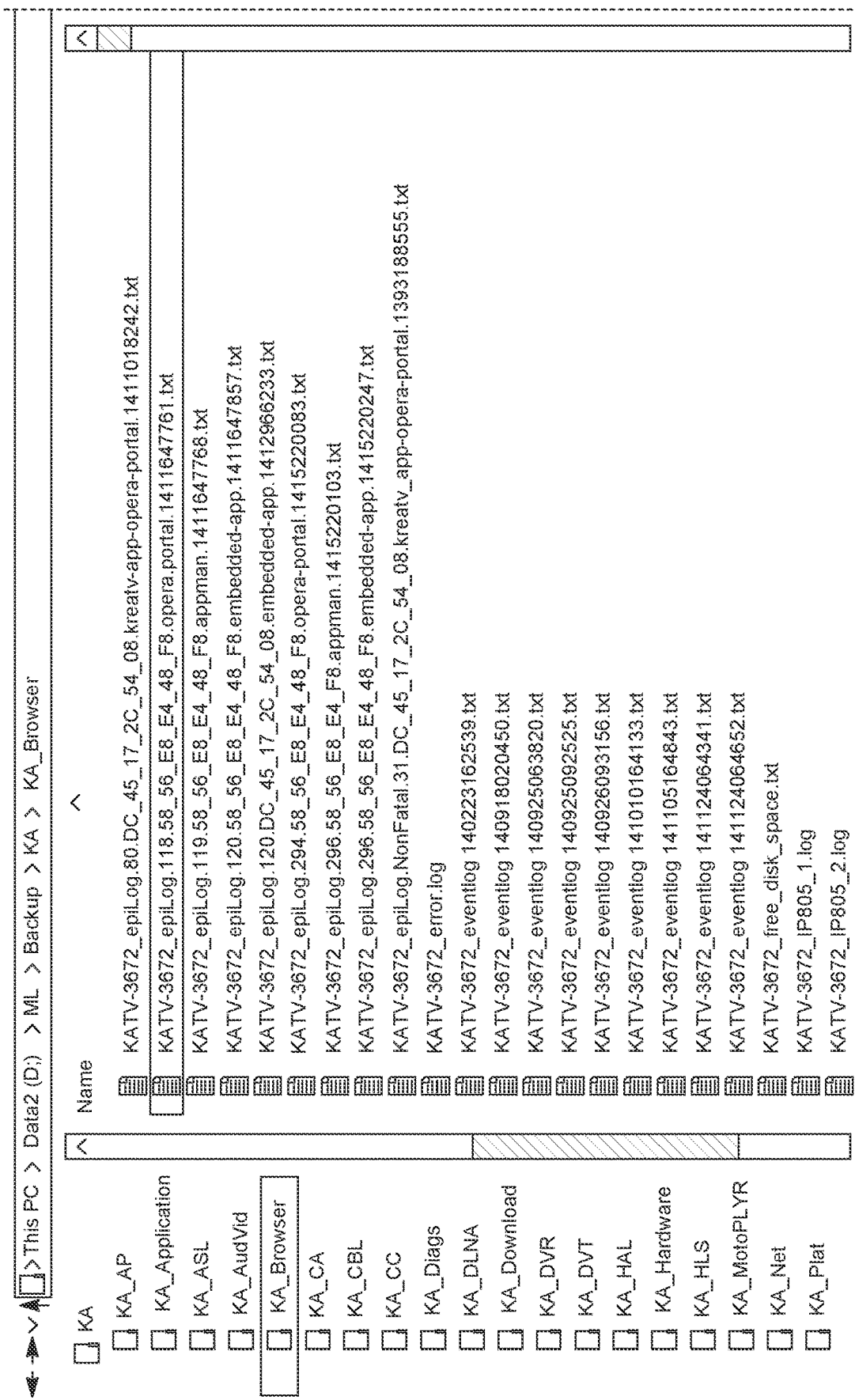

In accordance with an exemplary embodiment, the logs collected, for example, with the use of Jira will be system logs containing logs from each of the components, for example, of the set-top box 120. For example, the collected logs can include components such as browser, mediamanager, streamer, etc., as shown in FIG. 4B.

In accordance with an exemplary embodiment, the next step in the process in the log collection is to extract each component to identify a process, which can be mapped to the components in which the component belongs within the set-top box 120. For example, for a set-top box 120, the logs that belong to process "blinkman" could be extracted and grouped under a folder "KA_Browser" as shown in FIG. 4C. Other processes can include, for example, superman, streamer, halserver, bluetoothservice, netconfig, dial, upnpdm, upnpigd, netflixman, storageman, migrationservice, download, softwaremanager, widevine, opusservice, playready, drmservice, dtcpservice, mediacipherservice, autoprovisioning, usersettingman, serialdiagnostics, diagnostics, hlskeymanager, hlsservice, closedcaptionsman, httpmediaserve, dtcpservice, easservice, oobman, mediamanager, timeman, siman, appman, sysman, and procman.

Figure 4D:
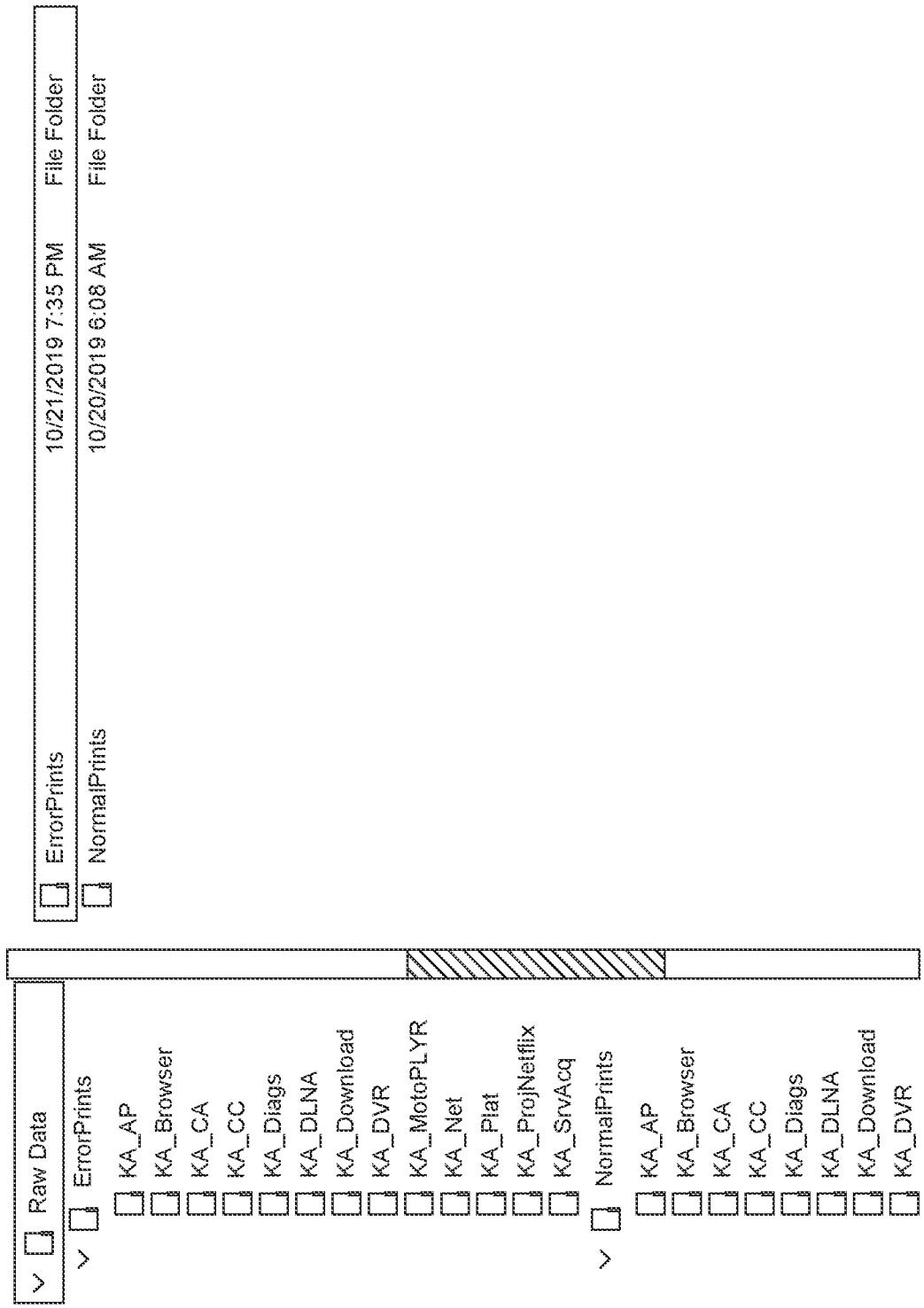

In accordance with an exemplary embodiment, the logs filtered as shown in FIG. 4C will have both error and normal logs for the process. Accordingly, the logs should be separated into "Error" and "Normal", and applying a label for input into the artificial intelligence (AI) model for training. For example, as shown in FIG. 4D, a folder structure format such as ErrorPrints and NormalPrints can be used. ErrorPrints containing the error print of the each process grouped under the folder by "Component Name". NormalPrints containing the normal print of the each process grouped under the folder by "Component Name".

In accordance with an exemplary embodiment, once the log collection has been grouped as disclosed herein, the path of each of the folders can be provided as input to a log parsing 320 module. In the log parsing 320 module, the unstructured logs are converted to a structured log using an algorithm, for example, Drain. For example, Drain is an algorithm for log parsing, which parses logs in a streaming and timely manner using a fixed depth parse tree.

For example, as shown in FIG. 5, the log parsing comprises:
Input: Folder path from the log collection module
Output:
1. Structured and template file for each component exists in the input folder path
2. Label.csv file
EventTemplate: Structured log message
Label: Name of the component to which structured log message belongs to In accordance with exemplary embodiment, once the logs have been parsed, feature extraction 330 is performed. For example, the Label.csv file generated from log parsing can be used as input for the feature extraction using, for example, a support-vector machine algorithm. In accordance with an exemplary embodiment, feature extraction is preferably performed on the complete log message rather than just keywords. For example, with a support-vector machine algorithm, the log message is converted into a vector matrix as disclosed herein.

Once the feature extraction has been performed, an anomaly detection 340 is performed to (1) log file to which prediction has to be made, (2) convert the log file into structured log file using, for example Drain, and (3) use the (saved) AI model created to predict the anomaly component by pass the structured log file as input.

For example, a code walk though can be performed by downloading the code from the code repository, using "requirement.txt" to install the dependency and command: pip install-r requirement.txt.

In accordance with an exemplary embodiment, the label.csv file can be created using the KALogProcessor.py function "ConstructLabelFile" which takes (1) Folder path—log collection path as input, (2) Folder path to store the structured csv file of each component and label.csv file, and (3) log format used to log the message. The unstructured log can be converted to a structured log by using the KALogProcessor.py function "PreProcessLogFile" which takes the (1) Folder path which contains the unstructured log file, (2) Folder path to store the structured file, and (3) log format used to log the message.

In accordance with an exemplary embodiment, the code, for example, can be tested using the "TestRaisedJira" function of the KALogProcessor. In addition, the artificial intelligence (AI) model can be tested by navigating to the path, for example, "Ipa\SVM\" in the command line and run, for example, "python -m LogAnalyzer.SVM.SVM".

Figure 6:
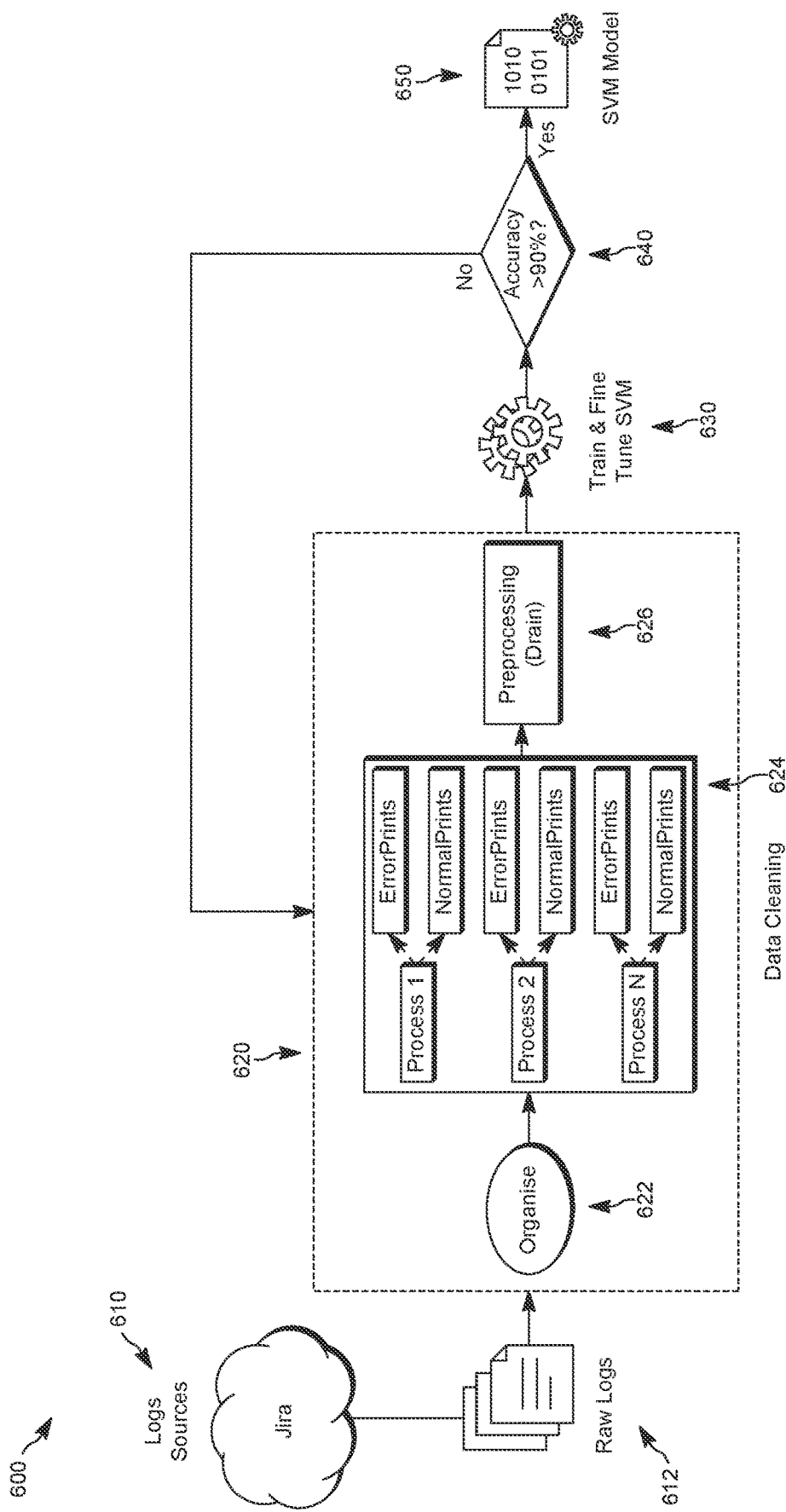
FIG. 6 is an illustration of an exemplary flowchart for generation of a support-vector machine model.

FIG. 6 is an illustration of an exemplary flowchart 600 for generation of a support-vector machine model. As shown in FIG. 6, the log sources 610, for example, one or more set-top boxes 120 will provide raw logs 612 to the database 210. The database 210 in step 620 will clean the data from the raw logs 612 by organizing the data in step 622, processing the data in step 624, and preprocessing the data (for example, using Drain) in step 626. In step 630, the data from the preprocessing is trained and fine-tuned by a support-vector machine algorithm. In step 640, a determination is made if the trained and fine-tuned support-vector machine has a predetermined accuracy, for example, above 90%, and if not, the data is returned for additional data cleaning and training of the support-vector machine algorithm. If the accuracy of the support-vector machine algorithm meets the predetermined accuracy, for example, greater than 90%, the support-vector machine algorithm has been generated and can be further implemented as disclosed herein.

Figure 7:
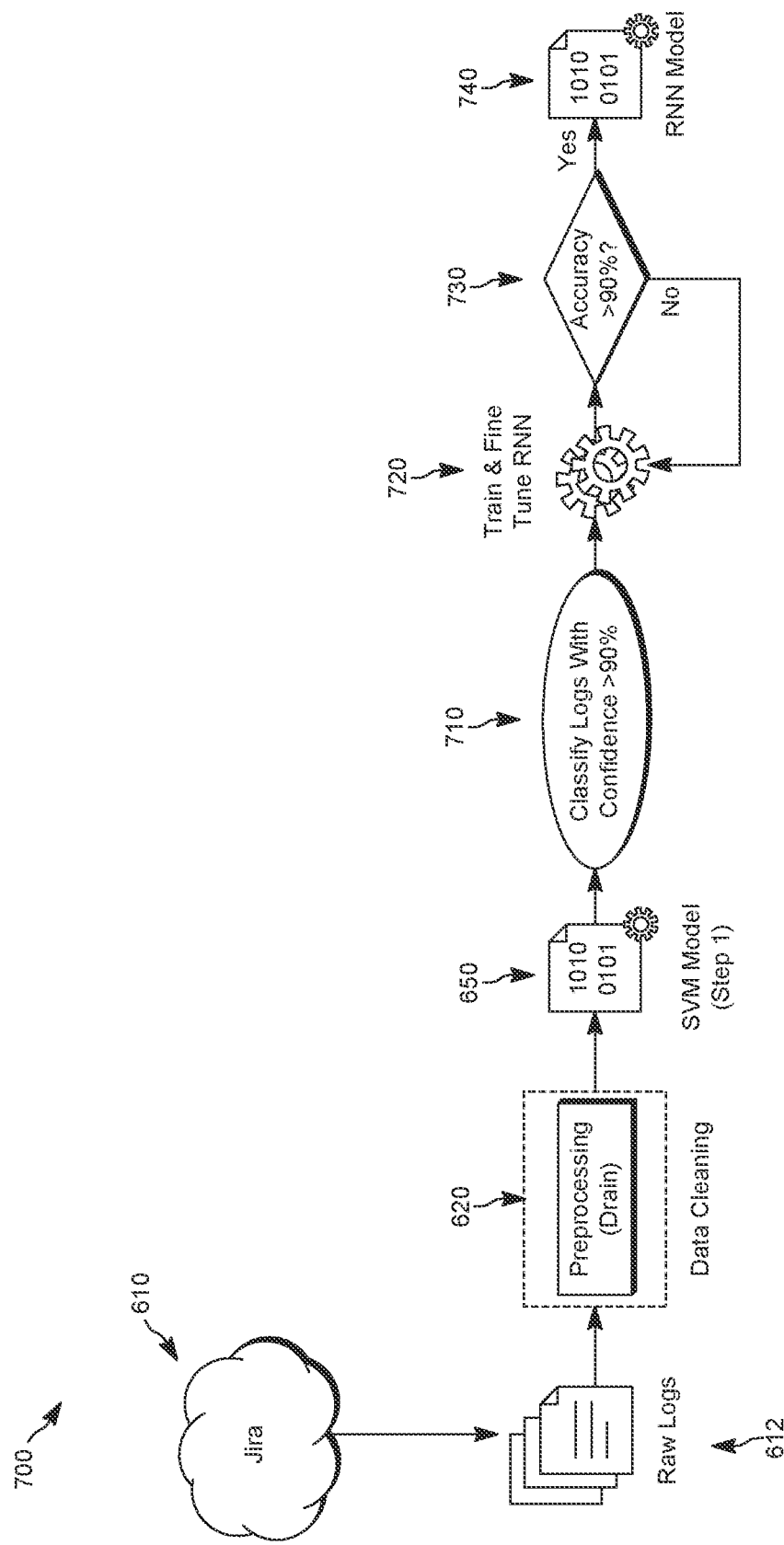
FIG. 7 is an illustration of an exemplary flowchart for generation of a recurrent neural network model.

FIG. 7 is an illustration of an exemplary flowchart 700 for a recurrent neural network model generation. As shown in FIG. 7, the log sources 610, for example, for one or more set-top boxes 120 will provide raw logs 612 to the database 210. In step 620, a data cleaning is performed on the raw logs. The cleaned data is then provided to the support-vector machine model 650 as disclosed in FIG. 6. In step 710, if the support-vector machine model 650 can classify the logs with a predetermined confidence level, for example, greater than 90%, the cleaned logs in step 630 are input into, for example, a recurrent neural network (RNN) 720 for training and fine tuning. If the accuracy of the output 730 from the recurrent neural network is greater than a predetermined percentage, for example, 90%, then the recurrent neural network model 740 can be generated and further implemented as disclosed herein. Alternatively, if the accuracy of the output 730 from the recurrent neural network 720 is below the predetermined accuracy level, the recurrent neural network 720 requires further training and fine tuning to obtain the desired accuracy.

Figure 8:
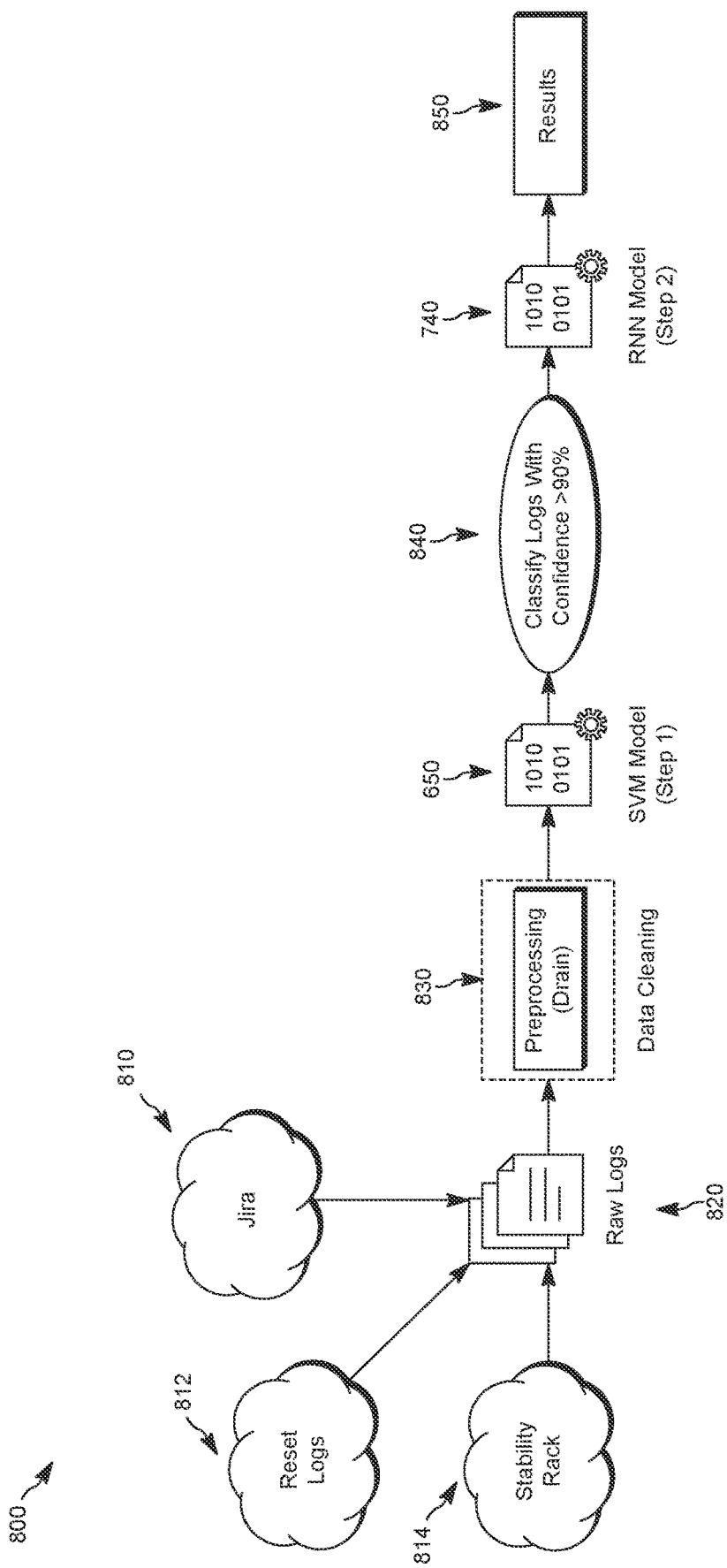
FIG. 8 is an illustration of an exemplary flowchart for prediction using the support-vector machine model generated from FIG. 6 and the recurrent neural network model generated from FIG. 7.

FIG. 8 is an illustration of an exemplary flowchart 800 for prediction using the support-vector machine model generated from FIG. 6 and the recurrent neural network model generated from FIG. 7. As shown in FIG. 8, one or more log sources 810, 812, 814, can be input into the database 120 in the form of raw logs 820. In step 830, a data cleaning on the raw logs 820 is performed. The cleaned data from step 830 is then input into the support-vector machine model 650 generated in FIG. 6. In step 840, if the logs can be classified about a predetermined percentage, for example, above (or greater than) 90% the output from the support-vector machine model 650 is input into the recurrent neural network model 740 from FIG. 7. In accordance with an embodiment, the output or results 850 from the recurrent neural network model 740 can be used to detect bugs, for example, in code of the one or more set-top boxes 120 and generate automated fixes, for example, which can be self-executed on the set-top box 120, or alternatively, pushed to the one or more set-top boxes 120 from a cable provider server 110 for improved performance of the set-top box 120.

Figure 9:
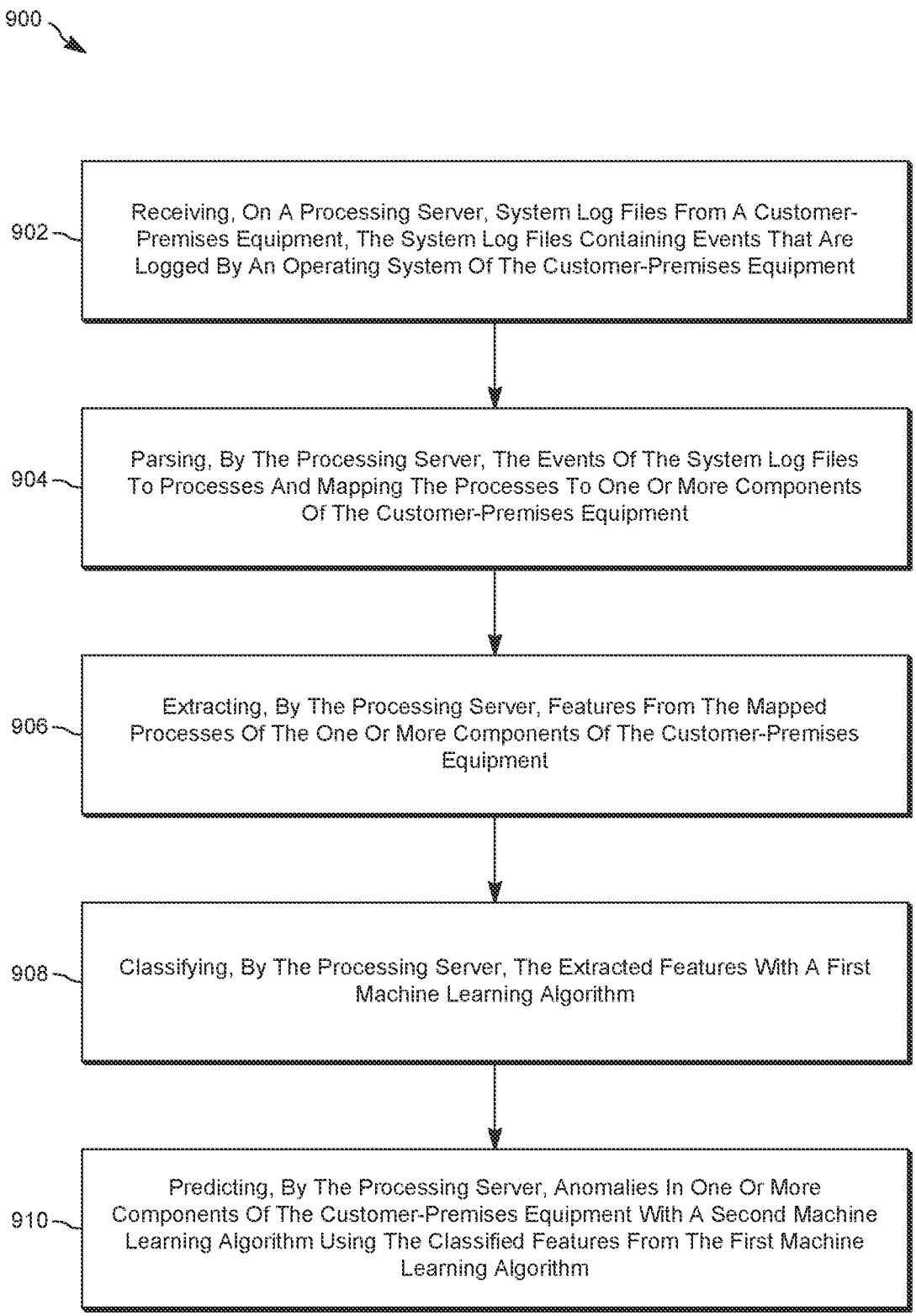
FIG. 9 is a flow chart of an exemplary method for log based issue prediction on customer-premises equipment (CPE).

FIG. 9 is a flow chart of an exemplary method 900 for log based issue prediction. As shown in FIG. 9, in step 902, a processing server receives system log files from a customer-premises equipment, the system log files containing events that are logged by an operating system of the customer-premises equipment. In step 904, the events of the system log files are parsed by the processing server to processes and mapping the processes to one or more components of the customer-premises equipment. In step 906, features from the mapped processes of the one or more components of the customer-premises equipment are extracted by the processing server. In step 908, the extracted features are classified with a first machine learning algorithm. In step 910, anomalies in one or more components of the customer-premises equipment are predicted with a second machine learning algorithm using the classified features from the first machine learning algorithm.

In accordance with an exemplary embodiment, the first machine learning algorithm is a support vector learning algorithm, and the second machine learning algorithm is a recurrent neural network algorithm. In addition, each of the first machine learning algorithm and the second machine learning algorithm are trained to a first predetermined accuracy, and a second predetermined accuracy, respectively, for example, 75% to 99%, and for example, at least 90%. In accordance with an exemplary embodiment, the processing server is configured to separate each of the features from the mapped process into an error log entry or a normal log entry for the training of the first machine learning algorithm.

In accordance with an exemplary embodiment, the predicted anomalies in the features of the one or more components of the customer-premises equipment using the second machine learning algorithm comprises a defect in code of one or more of the components of the customer-premises equipment, and the method further includes executing, by the processing server, a fix to code of the customer-premises equipment. In addition, the processing server is configured to perform the parsing of the events of the system log files to the processes and mapping the processes to one or more components of the customer-premises equipment with an algorithm for log parsing. In accordance with an exemplary embodiment, the first machine learning algorithm converts the log messages into a vector matrix using complete log message rather than keywords.

In accordance with an exemplary embodiment, the customer-premises equipment is a set-top box.

In accordance with an exemplary embodiment, the processing server is a part of the customer-premises equipment. Alternatively, the processing server is a part of a cable provider server.

Computer System Architecture

Figure 10:
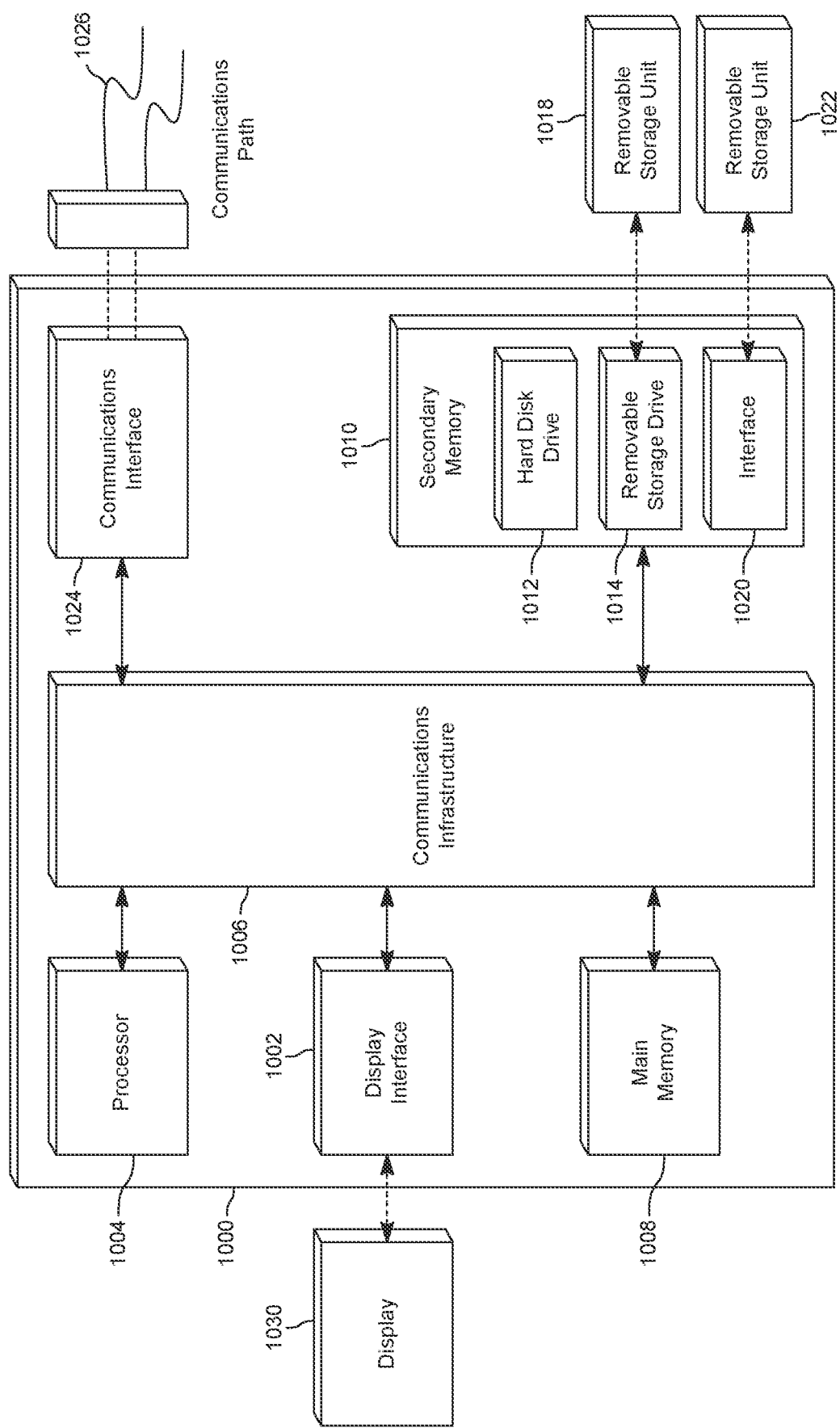
FIG. 10 is an exemplary hardware architecture for an embodiment of a communication device.

FIG. 10 illustrates a representative computer system 1000 in which embodiments of the present disclosure, or portions thereof, may be implemented as computer-readable code executed on a processor of a computer. For example, the one or more processing servers or servers 110, 210, 212, 214, 216, the CPE broadband device, for example, the set-top box 120, and the one or more devices 130 of FIGS. 1 and 2 may be implemented in whole or in part by a computer system 1100 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the present disclosure.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this representative computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 524 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 1-9, as discussed herein. Accordingly, such computer programs may represent controllers of the computer system 1000. Where the present disclosure is implemented using software executed on hardware, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software executed on hardware, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

Techniques consistent with the present disclosure provide, among other features, methods and systems for log based issue prediction using SVM+RNN artificial intelligence model on consumer premise equipment. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for log based issue prediction, the method comprising:
   receiving, on a processing server, system log files from a customer-premises equipment, the system log files containing events that are logged by an operating system of the customer-premises equipment;
   parsing, by the processing server, the events of the system log files to processes and mapping the processes to one or more components of the customer-premises equipment;
   extracting, by the processing server, features from the mapped processes of the one or more components of the customer-premises equipment;
   classifying, by the processing server, the extracted features with a first machine learning algorithm;
   predicting, by the processing server, anomalies in one or more components of the customer-premises equipment with a second machine learning algorithm using the classified features from the first machine learning algorithm; and
   executing, by the processing server, a fix of the anomalies in the one or more components of the customer-premises equipment.

2. The method according to claim 1, wherein the first machine learning algorithm is a support vector learning algorithm, and the second machine learning algorithm is a recurrent neural network algorithm.

3. The method according to claim 1, further comprising:
   training the first machine learning algorithm to a first predetermined accuracy; and
   training the second machine learning algorithm to a second predetermined accuracy.

4. The method according to claim 3, further comprising:
   separating, by the processing server, each of the features from the mapped processes into an error log entry or a normal log entry for the training of the first machine learning algorithm.

5. The method according to claim 1, wherein the predicted anomalies in the features of the one or more components of the customer-premises equipment using the second machine learning algorithm comprises a defect in code of one or more of the components of the customer-premises equipment.

6. The method according to claim 1, wherein the customer-premises equipment is a set-top box.

7. The method according to claim 1, further comprising:
   performing, by the processing server, the parsing of the events of the system log files to the processes and mapping the processes to one or more components of the customer-premises equipment with an algorithm for log parsing.

8. The method according to claim 1, wherein the first machine learning algorithm converts the system log files into a vector matrix using complete log messages rather than keywords.

9. The method according to claim 1, wherein the processing server is a part of the customer-premises equipment.

10. The method according to claim 1, wherein the processing server is a part of a cable provider server.

11. A set-top box comprising:
    a processor configured to:
      receive system log files containing events that are logged by an operating system of the set-top box;
      parse the events of the system log files to processes and mapping the processes to one or more components of the set-top box;
      extract features from the mapped processes of the one or more components of the set-top box;
      classify the extracted features with a first machine learning algorithm;
      predict anomalies in one or more components of the set-top box with a second machine learning algorithm using the classified features from the first machine learning algorithm; and
      execute a fix of the anomalies in the one or more components of the set-top box.

12. The set-top box according to claim 11, wherein the first machine learning algorithm is a support vector learning algorithm, and the second machine learning algorithm is a recurrent neural network algorithm.

13. The set-top box according to claim 11, wherein the first machine learning algorithm is trained to a first predetermined accuracy, and the second machine learning algorithm is trained to a second predetermined accuracy.

14. The set-top box according to claim 13, wherein the predicted anomalies in the features of the one or more components of the set-top box comprises a defect in code of one or more of the components of the set-top box.

15. The set-top box according to claim 11, wherein the processor is further configured to:
   perform the parsing of the events of the system log files to the processes and mapping the processes to one or more components of the set-top box with an algorithm for log parsing.

16. A non-transitory computer readable medium having instructions operable to cause one or more processors to perform operations comprising:
   receiving, on a processing server, system log files from a customer-premises equipment, the system log files containing events that are logged by an operating system of the customer-premises equipment;
   parsing, by the processing server, the events of the system log files to processes and mapping the processes to one or more components of the customer-premises equipment;
   extracting, by the processing server, features from the mapped processes of the one or more components of the customer-premises equipment;
   classifying, by the processing server, the extracted features with a first machine learning algorithm;
   predicting, by the processing server, anomalies in one or more components of the customer-premises equipment with a second machine learning algorithm using the classified features from the first machine learning algorithm; and
   executing, by the processing server, a fix of the anomalies in the one or more components of the customer-premises equipment.

17. The non-transitory computer readable medium according to claim 16, wherein the first machine learning algorithm is a support vector learning algorithm, and the second machine learning algorithm is a recurrent neural network algorithm.

18. The non-transitory computer readable medium according to claim 16, further comprising:
   training the first machine learning algorithm to a first predetermined accuracy; and
   training the second machine learning algorithm to a second predetermined accuracy.

19. The non-transitory computer readable medium according to claim 18, further comprising:
   separating, by the processing server, each of the features from the mapped processes into an error log entry or a normal log entry for the training of the first machine learning algorithm.

20. The non-transitory computer readable medium according to claim 16, wherein the predicted anomalies in the features of the one or more components of the customer-premises equipment using the second machine learning algorithm comprises a defect in code of one or more of the components of the customer-premises equipment.

21. The method according to claim 1, wherein the executing the fix to code of the customer-premises equipment further comprises:
   transmitting, by the processing server, the fix to the customer-premises equipment.

22. The non-transitory computer readable medium according to claim 16, wherein the executing the fix to code of the customer-premises equipment further comprises:
   transmitting, by the processing server, the fix to the customer-premises equipment.

* * * * *